Figure 1:
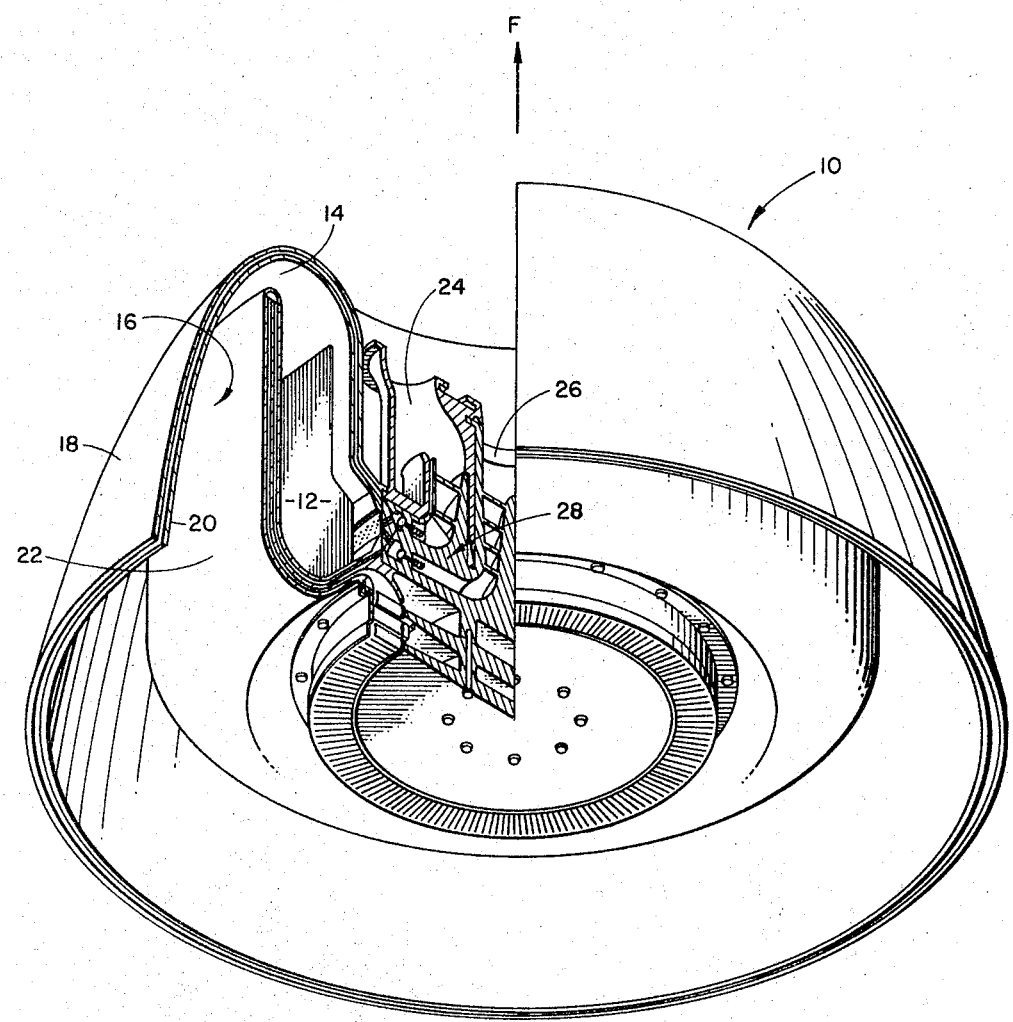

March 7, 1967     T. E. COWELL     3,307,359
TURBOPUMP ASSEMBLY

Filed June 26, 1963     2 Sheets-Sheet 1

INVENTOR.
THOMAS E. COWELL

BY

ATTORNEY

INVENTOR.
THOMAS E. COWELL
BY
Donald W. Graves
ATTORNEY

3,307,359
TURBOPUMP ASSEMBLY
Thomas E. Cowell, Woodland Hills, Calif., assignor to
North American Aviation, Inc.
Filed June 26, 1963, Ser. No. 290,721
2 Claims. (Cl. 60—258)

This invention relates to rocket engines and other thrust producing devices.

More particularly, this invention relates to a turbopump and rotating injector combination having an integrated valve system for rocket engines and the like.

Many rocket engines in the art include a system of turbines for driving a fuel pump and a separate oxidizer pump to pressurize propellants. These pumps supply the propellants to an injector where the propellants enter a combustion chamber. After combustion, the gases are accelerated and allowed to expand in a nozzle resulting in thrust.

Typically, the turbines are powered by a separate gas generator. The turbines, by a shaft or gear arrangement, turn the separate oxidizer and fuel pumps which then supply the propellants under pressure to an injector. Thus, in most systems, the need for a separate gas generator, turbine, oxidizer pump and fuel pump, results in an engine system of high weight, large size and complexity.

As an adjunct to the typical system described, it is often necessary to provide valves upstream of the injector in order to initiate or shut off propellant flow. As a result, with the use of upstream valves, it is necessary to first fill or prime the ducts leading from the valves to the injector with propellant prior to injection into the combustion chambed. Accordingly, after actuation of the valves, there is a time delay before the propellants flow from the valve system to the injector since the ducts are initially empty and have to be filled. In addition, the process of filling the empty ducts creates cavitation problems and pressure oscillation in the pumping system.

Another problem associated with prior art devices resides in the delay, or lack of it, in introducing the proper propellants in a sequential manner. For example, it is often desirable for combustion stability to inject one of the propellants into the combustion chamber prior to injection of the other propellant. This necessitates a proper valve timing such as opening the oxidizer valve first and then after a pre-determined period of time opening the fuel valve. Since such factors as viscosity, temperature, tank pressurization and duct length are all factors in determining the proper sequential timing of the valve openings, such timing is not a simple matter.

It is also necessary with typical engine systems to inject the propellants in such a manner that proper impingement and hence mixing of the propellants occurs. This is important in achieving atomization and hence combustion stability. Usually, the injection is accomplished through fixed injector orifices. Accordingly, to achieve proper atomization of the propellants in a fixed injector pattern, many approaches have been made. Usually, it is necessary to provide for orifices drilled at pre-selected patterns. Due to the intricacies in orifice design, problems arise in fixed injector systems.

It is to obviate the many disadvantages of the prior art that this invention is directed. The engine system according to this invention consists essentially of an integral rotating oxidizer and fuel pump assembly and turbine. Also included in this integral assembly is a rotating injector for the fuel and oxidizer wherein immediately upstream of the injector is provided a valve system actuated by pressure. The pump system pumps the propellants against the valves and when a certain pressure is reached, the valves open, thus injecting the fuel and oxidizer into the combustion chamber. This pump system is integral with and driven by a turbine powered by gas from a tap-off arrangement of one of the propellants which in the instant system is hydrogen.

It is therefore an object of this invention to provide an improved pump and turbine system along with an improved injector assembly formed as part of the pump and turbine system.

It is a more particular object of this invention to provide an integral pump and turbine system formed as part of a rotating injector and having associated therewith a valve system operated by propellant pressure so as to initiate the proper sequence of propellant injection into the combustion chamber.

Figure 2:
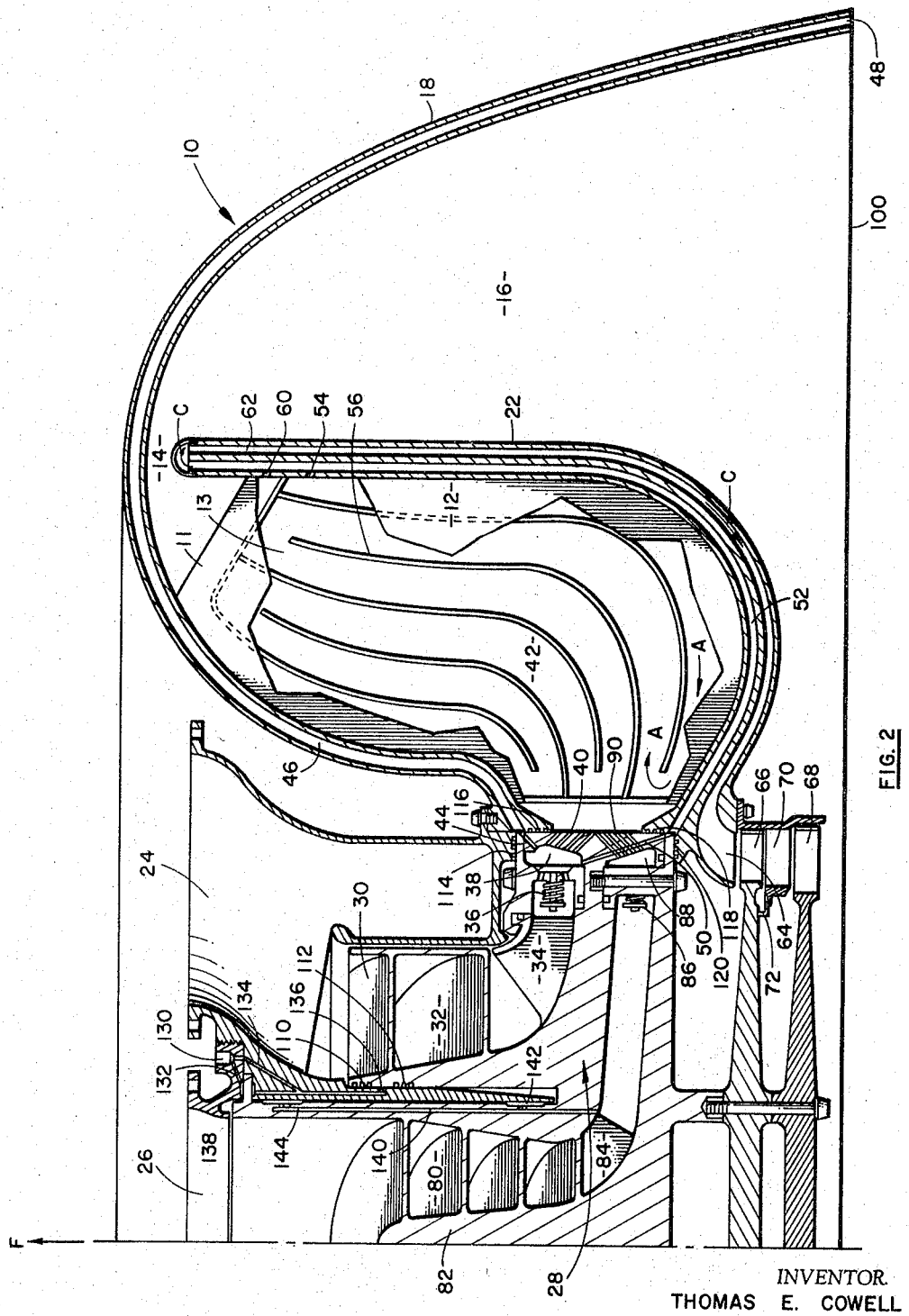

Other objects and advantages of the invention will become apparent when taken in conjunction with the accompanying description and drawings in which:

FIG. 1 is a perspective view partially in cross-section of one embodiment of the invention, and, FIG. 2 is a partial view in cross-section showing in detail the pump, turbine and injection system of the invention.

Referring now to FIG. 1, there is shown a rocket engine system designated generally as 10. This engine system is constructed in some respects similar to that disclosed in U.S. Patent No. 3,173,250 assigned to the assignee of this invention. As disclosed in that patent the propellants are injected forwardly and after combustion are accelerated, expanded and redirected rearwardly. This is termed an R-F engine (reverse flow). However, in that application, a substantially conventional system of turbines, pumps and injectors are utilized. The combustion zone is represented generally as 12 with a throat area 14 and thrust chamber volume 16. Gases combusted in combustion chamber 12 are accelerated in throat region 14 and are re-directed and expanded in thrust chamber 16. The gases are exhausted rearwardly in the opposite direction of the arrow F. The nozzle is designated as 18 which on its interior portion 20 forms with the shield 22 the combustion chamber. Indicated generally at 26 is the oxidizer inlet. Fuel inlets, one of which is shown at 24, are circumferentially spaced about the oxidizer inlet 26. Ducts are provided, but are not shown here for clarity. These ducts lead to propellant tanks in a conventional manner. The rotating pump, injector and turbine assembly is at 28 which in FIG. 1 is not shown in detail.

For a more detailed explanation of the invention, reference is made to FIG. 2. Shown at 24 is a non-rotating fuel inlet. Fuel such as liquid hydrogen, under influence of rotating vanes 30 in fuel inducer 32 will be forced into region 34 which comprises an impeller for further pressurizing the fuel. A spring-loaded poppet valve 36 of which there may be many in number circumferentially spaced about the assembly 28 is shown which, under pressure, opens allowing the fuel to enter manifold area 38. The fuel then passes through injector orifices 40 into the combustion chamber represented generally as 42. A tap-off port 44 of which there may also be many is provided so that a portion of the fuel will enter passages 46 in nozzle 18. These passages may be formed by the nozzle walls or by tubes. This fuel, which is preferably liquid hydrogen, absorbs heat from the combustion chamber walls, is gassified and traverses passages 46 and exits the engine at exit plane 48. Another tap-off arrangement 50 is provided so that a portion of the fuel will pass into chamber or chambers 52. A portion of this fuel will enter aperture 54 in rib 12 which is formed by parallel walls with rib members 56 acting as baffles therein. Fuel entering aperture 54 will travel in the general direction of the arrows indicated as A, thus cooling the rib 12 which not only provides a baffle in the combustion chamber for combustion stability, but also supports the shield 22. This fuel functions to cool rib 12. After traversing the passages, the fuel which has been heated will pass through aperture 60 and with the fuel already in passage 52 will then pass initially upwardly and then downwardly into chamber 62 in the direction indicated by arrows C. The gas then eventually passes out an exit plane indicated at 64 and impinges on turbine blades 66 and 68. Stationary vanes 70 are attached to the shield 22 to aid in directing the gases. A lip 72 is provided to prevent dispersion of the heated gases so that their energy may be more efficiently utilized by the turbine blades 66 and 68.

Oxidizer from duct 26 is forced by inducer blades 80 in oxidizer pump 82 into impeller 84 and when sufficient pressure is reached will open poppet valves 86 and enter manifold 88 and then into combustion chamber 42 through injector orifices 90. When the fuel passing through injector orifices 40 impinges with the oxidizer passing through injector orifices 90, combustion occurs and is completed in combustion chamber 42. This combustion may be hypergolic or initiated by conventional means not shown. These expanded gases are then accelerated through throat region 14 and thence into thrust chamber 16 passing out at exit plane 100 of the thrust chamber imparting useful thrust to a vehicle of which the engine is a part.

To aid in sealing, running seals which are of the labyrinth type are indicated at 110 and 112 on the fuel side of the integral pump assembly. Also shown at 114 and 116 are labyrinth seals for further sealing. On the oxidizer side, walls 118 and 120 are used. In addition, an inert gas such as argon or helium is placed under high pressure into port 130 and thence into lines 132 and 134. This provides a purge in the region of 136 and 138. Oxidizer in pump 82 which is pressurized by the inducer blades 80 is forced up line 140 and aids in hydrostatically cooling bearings not shown. This oxidizer will enter areas 142 and 144 to aid in lubrication of these bearings, if bearings are used. However, the unit is dynamically stable when rotated and bearings may be obviated by a Teflon coating on the moving parts to reduce friction during the start sequence. Any tendency for the oxidizer to pass by the labyrinth seal 112 is resisted by the higher pressure inert gas coming in at 136. Likewise, any tendency for the oxidizer to leak into the fuel duct in the region of 144 and above will be resisted by the purge provided in line 132. While a single rib 12 has been shown, in actuality, a plurality of these ribs are spaced circumferentially about the engine to provide support for the shield 22 as well as baffles for combustion stability. Also, while only one fuel duct 24 has been shown, there is provided a plurality of these ducts which are spaced about the center oxidizer duct 26.

In operation, fuel from propellant tanks not shown will pass through conduits, also not shown, into the fuel ducts 24 which are part of the stationary portion of the missile.

Assembly 28 is initially rotated by means not shown so as to pressurize the propellants. Such means may consist of gas generating cartridge which is arranged to impinge gases on the turbine blades. After serving the function of imparting initial rotation, the cartridge will burn out and the hot gases from the shield will maintain the rotation. The rotating fuel inducer 30 by means of inducer blades 32 will initially pressurize this fuel which is brought up to the final pressure by the impellers 34. Upon the attainment of a predetermined pressure, valves 36 are opened allowing the fuel to enter manifolds 38 and through injector orifices 40 into combustion chamber 42. At the same time, a portion of this fuel passes through chamber 46 and absorbs heat from the nozzle wall 18, thus aiding in cooling of the nozzle. The gas will then exit at exit plane 48. Another portion of the fuel will pass through apertures 50 into passages 52. A portion of this fuel will pass through apertures 54 into the chambers formed by parallel walls 11 and 13 making up rib 12 and directed by baffles 56 into a predetermined path so as to absorb large amounts of heat. This will aid in cooling while at the same time serves to gassify the fuel to a relatively high temperature. This fuel then will pass by means of aperture 60 back into channel 52 and as shown by the arrow C will exit at plane 64 to impinge on turbine blades 66 and 68 so as to impart rotation to the integral pump assembly 28. Thus, a portion of the fuel is heated and expanded to impart energy to the turbine which, being formed as an integral part of the pump assembly, pumps the fuel into the combustion chamber. At the same time, oxidizer from an oxidizer tank, not shown, enters the duct 26 and by means of inducer 82 and blades 80 will be initially pressurized to its final pressure by impeller 84. Upon the attainment of a high enough pressure, poppet valves 86 will open, allowing the oxidizer to enter the manifold 88 and thence through injector orifices 90 in the rotating injector member into the combustion chamber where the propellants impinge against each other and are ignited by conventional means not shown. The bearings, if used, are lubricated by the oxidizer passing into line 140. To prevent the oxidizer from mixing with the fuel, an inert gas purge is provided by introduction of the gas through ports 130.

Thus it can be seen that by providing an integrated pump and turbine assembly along with a rotating injector with automatically operated valves, the necessity for a complicated separate gas generating system, pumps and turbines is obviated. Also, this invention utilizes the otherwise unusable space interiorly of the nozzle portion. In addition, with the number of fuel valves and the pressure response characteristics thereof along with a similarly pre-determined number of oxidizer valves with their associated pressure characteristics pre-determined, the mixture ratio of oxidizer and fuel can be varied at will. Also, either the fuel or oxidizer inlet valves 36 and 86 respectively, may be varied so that either the fuel or oxidizer may be injected first to provide for combustion stability. Another advantage of this invention resides in having the fuel and oxidizer passages primed prior to ignition. For example, the valve characteristics may be such that the valves remained closed when the turbopump assembly is at rest. Immediately upon initiation of rotation, the valves may be set so that they are opened immediately to initiate combustion.

Having thus described the invention and the advantages thereof, it will be understood that the invention is not to be limited to the details herein disclosed, otherwise than is set forth in the claims appended hereto.

I claim:
1. In a rocket engine having a combustion chamber and nozzle, that improvement which comprises;
   a centrally located first rotatable propellant pump,
   a second rotatable pump, said second pump being concentric to said first pump and integral therewith,
   a rotatable impulse turbine formed integral with said pumps,
   injector means rotatable with said pumps and turbine adapted to receive propellant from said pumps and to inject said propellants into said combustion chamber,
   stationary means including a portion forming a combustion chamber wall to receive a portion of one of said propellants and to heat said propellant so as to form a gas and to direct said propellant to said turbine, whereby said turbine will rotate and drive said pumps so as to pump said propellants through said injector means into said combustion chamber,
   and valve means between said pumps and said injector means,
   said valve means being normally closed to prevent propellant flow, but adapted to open under a predetermined pressure of propellant from said pumps.

2. In a rocket engine having a combustion chamber and nozzle, that improvement which comprises;
a first pump rotatable relative to said rocket engine,
a second pump concentric to said first pump and rotatable therewith,
first and second injector means for said pumps respectively to inject propellants into said combustion chamber, said injector means being rotatable with said pumps,
impulse turbine blades affixed to said pumps,
normally closed valve means rotatable with said pumps, said valve means being located between each of said pumps and its injector, said valve means being adapted to open under pressure from said pumps,
stationary means including a portion forming a combustion chamber wall to transfer fluid from one of said pumps in heat transfer relationship to said rocket engine, and
means to direct said propellant against said turbine blades whereby to rotate said pumps.

References Cited by the Examiner
UNITED STATES PATENTS

| | | | |
|---|---|---|---|
| 2,536,600 | 1/1951 | Goddard. | |
| 2,536,601 | 1/1951 | Goddard. | |
| 2,958,183 | 11/1960 | Singelman | 60—35.6 |
| 3,036,428 | 5/1962 | Chillson | 60—35.6 |
| 3,107,488 | 10/1963 | Strauss et al. | 60—35.6 |
| 3,128,601 | 4/1964 | Abild | 60—35.6 |
| 3,137,128 | 6/1964 | Francais et al. | 60—35.6 |
| 3,145,530 | 8/1964 | Sobey | 60—35.6 |
| 3,151,446 | 10/1964 | Parilla | 60—35.6 |
| 3,173,250 | 3/1965 | Matzenauer | 60—35.6 |

MARK NEWMAN, *Primary Examiner.*

D. HART, *Assistant Examiner.*